(No Model.) 2 Sheets—Sheet 1.
J. C. CHAMBERLAIN & W. L. SILBEREISEN.
COMPOSITE PINION.
No. 426,982. Patented Apr. 29, 1890.
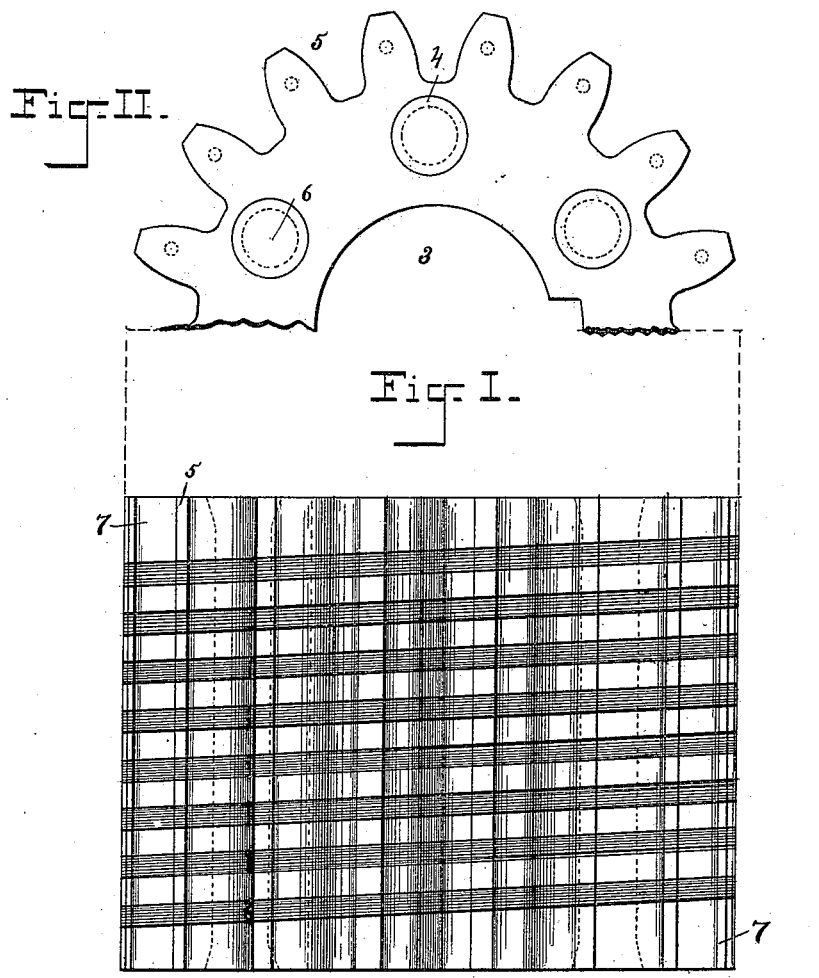
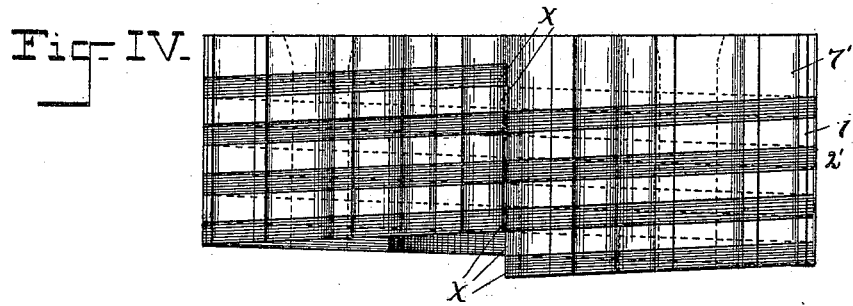

(No Model.) 2 Sheets—Sheet 2.
J. C. CHAMBERLAIN & W. L. SILBEREISEN.
COMPOSITE PINION.
No. 426,982. Patented Apr. 29, 1890.
Fig. III.
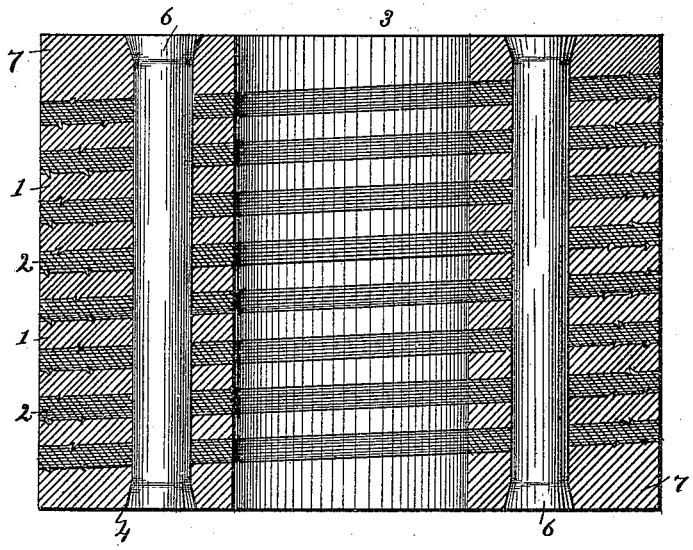
Fig. V.
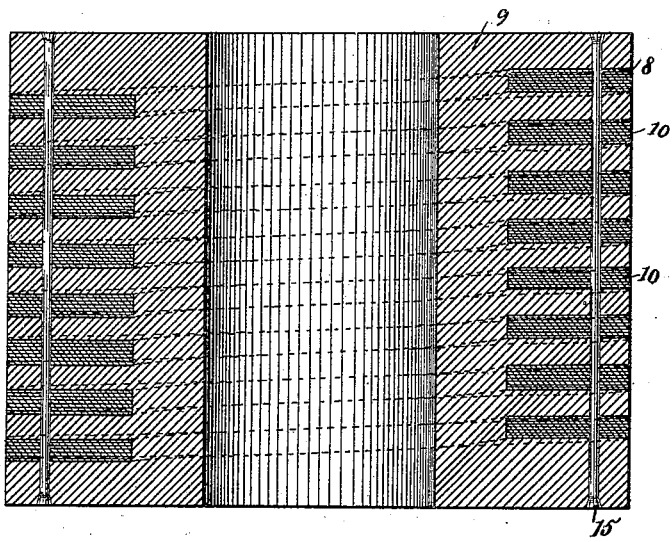
Witnesses
Lillie Hanna
Mazie V. Bidgood
Inventors
J. C. Chamberlain
W. L. Silbereisen
By Knight Bros.
Att'ys.
THE NORRIS PETERS CO., PHOTO-LITHO., WASHINGTON, D. C.

UNITED STATES PATENT OFFICE.

JACOB C. CHAMBERLAIN AND WILLIAM L. SILBEREISEN, OF NEW YORK, N. Y.; SAID SILBEREISEN ASSIGNOR TO SAID CHAMBERLAIN.

COMPOSITE PINION.

SPECIFICATION forming part of Letters Patent No. 426,982, dated April 29, 1890.

Application filed January 21, 1890. Serial No. 337,653. (No model.)

*To all whom it may concern:*

Be it known that we, JACOB CHESTER CHAMBERLAIN and WILLIAM L. SILBEREISEN, citizens of the United States, residing in the city, county, and State of New York, have invented certain new and useful Improvements in Composite Pinions, of which the following is a specification.

Our invention relates to improvements in composite pinions which are composed of alternate layers or plates of metal or other hard material and rawhide or comparatively soft or non-resonant material, so that the harder parts take most of the strain and wear, while the softer parts serve as cushions to render the gear smooth and noiseless in action. The said pinion engages with an ordinary or all-metal gear-wheel. Heretofore the aforesaid layers or plates of which the composite pinion was made have been placed in planes at right angles to the rotative axis of the pinion. With such a construction, the wear on the all-metal gear-wheel being confined almost wholly to the parts opposite and engaging with the metal layers of the composite pinion, circumferential grooves were in time worn at those parts, leaving interposed ridges at the parts opposite the rawhide. The wear being thus confined to a portion only of the all-metal wheel, the same is more rapidly worn away and its working life is considerably shorter than would be the case were the wear equally distributed. Furthermore, as the composite gear is in practice a comparatively small pinion, it wears away much faster than the all-metal wheel and has to be replaced more frequently, and when a new composite pinion is put into engagement with an all-metal wheel in which grooves have been worn, as above described, the grinding on both wheels due to this rough grooved surface is very destructive, the more so as the plates of the new pinion will not in general correspond or be in line with the grooves or ridges in the all-metal wheel.

The object of our invention is to distribute the wear equally over the working-face of the all-metal wheel, thereby lengthening the working life of the wheel and maintaining it in a noiseless condition for a longer time, and also maintaining it in condition to properly engage with a new pinion. To accomplish this result, we place the alternate layers of metal and rawhide of which the pinion is composed at a slight angle or cant to the axis of the wheel, so that the metal portions in bearing on the all-metal wheel travel laterally upon the same by a worm-like motion, so as to distribute the wear.

Another object of our invention is to prevent the rawhide plates of the pinion from slipping when clamped between the metal plates.

Referring to the accompanying drawings, which form a part of this specification, Figure I is a side elevation of a composite pinion constructed according to our invention. Fig. II is a partial end view, and Fig. III is an axial section, thereof. Figs. IV and V represent by side elevation and section, respectively, modified forms of pinion constructed according to our invention. Fig. VI is a diagram showing the wear on the all-metal gear-wheel.

The effect of wear on the all-metal wheel by the action of the gear-wheels as heretofore made is clearly shown in Fig. VI, in which various effects of wear are shown, the differences being mainly due to differences in lateral play of the gear-wheels. Thus at *b* is represented the wear which takes place where there is a minimum of such play, *c* where there is an average amount, and *d* where the gears are quite loosely mounted, so as to only leave slight ridges opposite the rawhide portions untouched by the metal plates. In these diagrams 11 represents the parts that bear against the metal disks, and 12 the portions opposite the rawhide disks.

*f* in Fig. 6 represents a peculiar wearing effect which takes place on a set of gears exposed to the magnetic action of the motor. When the machine is working under a heavy load—for example, at starting—the gear is attracted to one side, so as to bring the metal portions of the composite pinion opposite the parts 13, and the wear or grind being then very great deep grooves are cut at these parts; but when the motor is running freely it settles away into what may be considered the normal position, bringing the metal portions of the composite pinion opposite the parts 14, upon which the wear will therefore be but slight.

The pinion shown in Figs. I, II, and III is built up of rings or disks 1, of iron or steel or other metallic or hard material, with interposed rings or disks 2, of rawhide or equivalent comparatively soft or non-resonant material, such as vulcanized fiber or wood. These disks or rings have their center holes 3 for the shaft, holes 4 for the clamping-bolts, and their peripheral teeth 5 all bored or cut at a slight angle or inclination from the perpendicular to the ends or plane faces of the disks, so that when the disks are assembled and clamped together by bolts 6 and secured on the shaft their planes will be inclined to the axis of rotation. Suitably-beveled end plates 7 are provided to square up the ends of the pinion, and the other plates are clamped between these end plates by the aforesaid bolts.

As shown in Fig. I, the effect of the above construction is to cause the successive teeth of a ring to be slightly displaced in the direction of the axis with reference to one another, so that each tooth bears in part on a different portion of the engaging wheel from that engaged by the preceding tooth, thus shifting the wear and distributing it over the whole working-face of the all-metal wheel. To fully accomplish this result, it is necessary to give a lateral displacement between opposite diameters of the disks equal to the thickness of the rawhide disks. It is also necessary that the number of teeth on the composite pinion should not be exactly divisible into the number of teeth on the all-metal wheel, and it is desirable that the said numbers of teeth should be prime to or incommensurable with one another, so that each tooth on the pinion shall be brought into engagement with each tooth on the gear-wheel.

To prevent the rawhide disks from slipping when clamped between the metal disks, the end faces of the latter are provided with projections 16, which enter the rawhide. These projections are preferably struck up out of the surface of the disks like the teeth of a file.

In the construction shown in Fig. IV the rings 1' and 2' are split at one side, as at $x$, and the ends pulled apart laterally a slight distance, and they are then assembled together so that the end of each ring abuts against the opposite end of the next ring, forming in effect two continuous helices, one of steel, the other of rawhide, running side by side from one end to the other of the pinion. End plates, of which one is shown at 7', are provided, and the whole series of plates or rings are clamped by bolts and the gear-teeth cut in the periphery.

Substantially the same effect may be produced, as shown in Fig. V, by making a helical kerf or groove 8 in a solid wheel 9 and winding in such grooves a continuous rawhide band 10, so as to tightly fill the groove, the gear-teeth being then cut across the periphery. As it is not possible in this form to bind the rawhide between the metal surfaces with sufficient tightness to stand the working strain, additional support is furnished by small bolts 15, (shown in dotted lines in Fig. II,) passing through each tooth of the composite pinion.

It will be seen that in the forms shown in Figs. IV and V the metal portions of the composite wheel, while bearing against the other wheel, advance continually by a worm-like motion from one end to the other of the wheel, while in the form shown in Figs. I to III the bearing-point is merely shifted back and forth through a slight distance. The effect as to distribution of wear is, however, the same, and, broadly speaking, the same means is used for producing it—namely, the displacement of the teeth with regard to one another in the direction of the rotative axis or the arrangement of said teeth out of alignment with one another with reference to the plane of rotation.

Of course the above construction could be applied to gear-wheels in general as well as the pinions.

Having thus described our invention, the following is what we claim as new therein and desire to secure by Letters Patent:

1. A composite pinion or gear-wheel having toothed layers alternately of hard and soft or non-resonant material, the teeth of each layer being out of alignment with one another with reference to the plane of rotation, for the purpose set forth.

2. A composite pinion or gear-wheel having alternate layers of hard and soft or non-resonant material set at an inclination to the axis of rotation.

3. A composite pinion or gear-wheel having toothed layers alternately of metal and rawhide or their equivalents, the successive teeth of each layer being located successively in advance of one another in the direction of the axis of rotation.

4. The composite pinion or gear-wheel composed of metal and rawhide plates, with center hole for shaft and peripheral teeth cut obliquely to the plates, substantially as and for the purposes described.

5. The composite pinion or gear-wheel composed of metal plates 1, rawhide plates 2, beveled end plates 7, and clamping-bolts, substantially as set forth.

J. C. CHAMBERLAIN.
WM. L. SILBEREISEN.

Witnesses:
HARRY E. KNIGHT,
GEORGE S. BELL.